F. L. O. WADSWORTH.
APPARATUS FOR CUTTING PLASTIC GLASS AND SIMILAR SUBSTANCES.
APPLICATION FILED FEB. 26, 1913.

1,241,790.

Patented Oct. 2, 1917.

3 SHEETS—SHEET 1.

Witnesses
Frank A. Fahle
Josephine Casper

Inventor
Frank L. O. Wadsworth,
By Arthur M. Hood
Attorney

F. L. O. WADSWORTH.
APPARATUS FOR CUTTING PLASTIC GLASS AND SIMILAR SUBSTANCES.
APPLICATION FILED FEB. 26, 1913.

1,241,790.

Patented Oct. 2, 1917.

3 SHEETS—SHEET 2.

Witnesses
Frank A. Fahle
Josephine Gasper

Inventor
Frank L. O. Wadsworth,
By Arthur M. Hood
Attorney

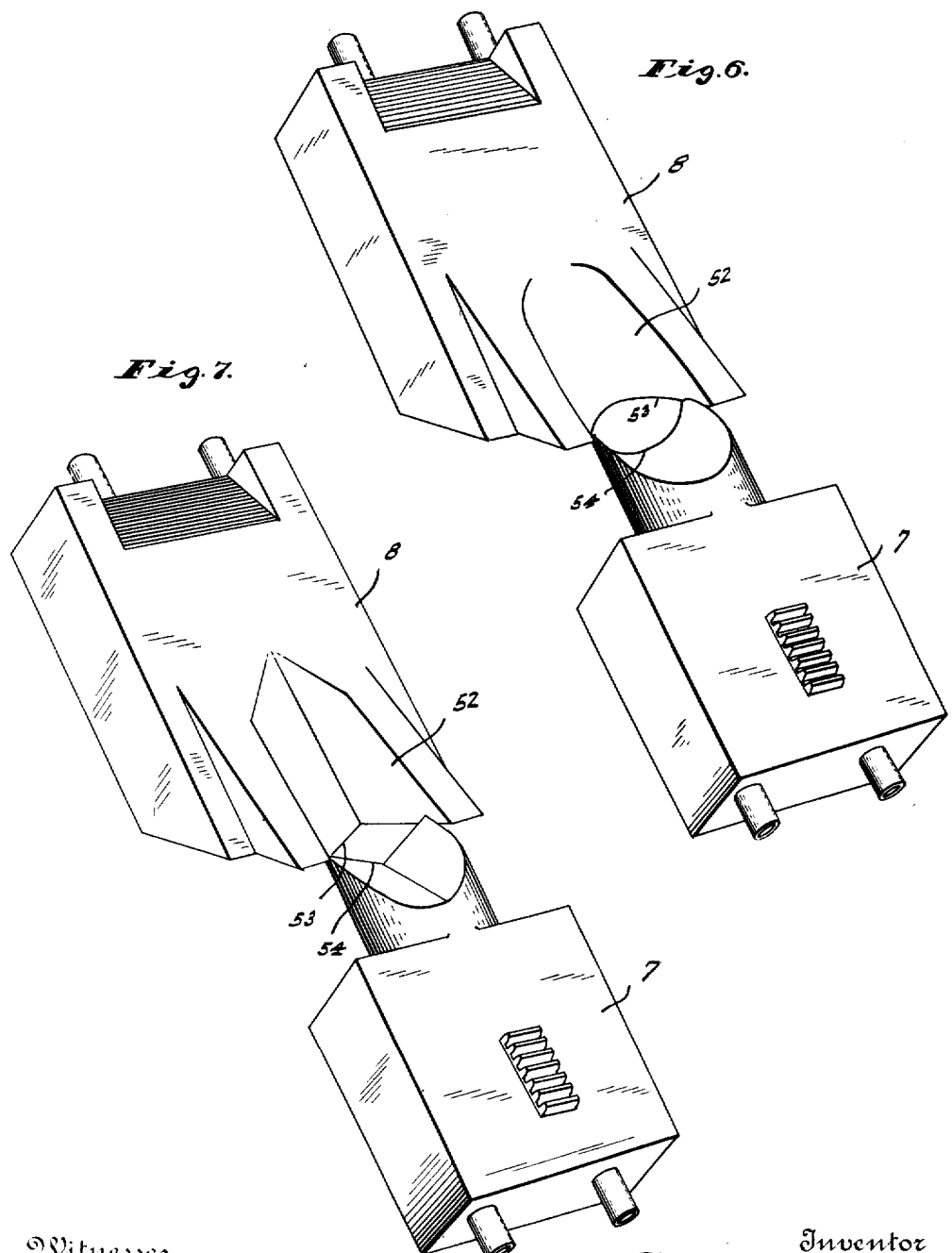

UNITED STATES PATENT OFFICE.

FRANK L. O. WADSWORTH, OF PITTSBURGH, PENNSYLVANIA, ASSIGNOR TO BALL BROTHERS GLASS MANUFACTURING COMPANY, OF MUNCIE, INDIANA, A CORPORATION OF INDIANA.

APPARATUS FOR CUTTING PLASTIC GLASS AND SIMILAR SUBSTANCES.

1,241,790.     Specification of Letters Patent.     Patented Oct. 2, 1917.

Application filed February 26, 1913. Serial No. 750,813.

*To all whom it may concern:*

Be it known that I, FRANK L. O. WADSWORTH, a citizen of the United States, residing at Pittsburgh, in the county of Allegheny and State of Pennsylvania, have invented a new and useful Apparatus for Cutting Plastic Glass and Similar Substances, of which the following is a specification.

My invention relates to improvements in the method and apparatus for cutting out a series of individual batches of glass from a large mass of the molten material in a furnace or other source of supply, and delivering them in succession to a series of molds or other receptacles in which each separate molten batch may be subjected to pressing or blowing or other forming operations. The particular objects of my improvement are to greatly increase the speed with which such operations may be carried on and to improve the quality of the product produced as a result of the operations. To this end my present improvements are directed primarily to a cutting mechanism so formed and associated with a delivery outlet of a furnace or other source of supply of molten glass that the stream issuing therefrom may be successively cut and manipulated in a manner to cause a lateral expansion of the freshly cut stream immediately above the cut.

Figure 1:
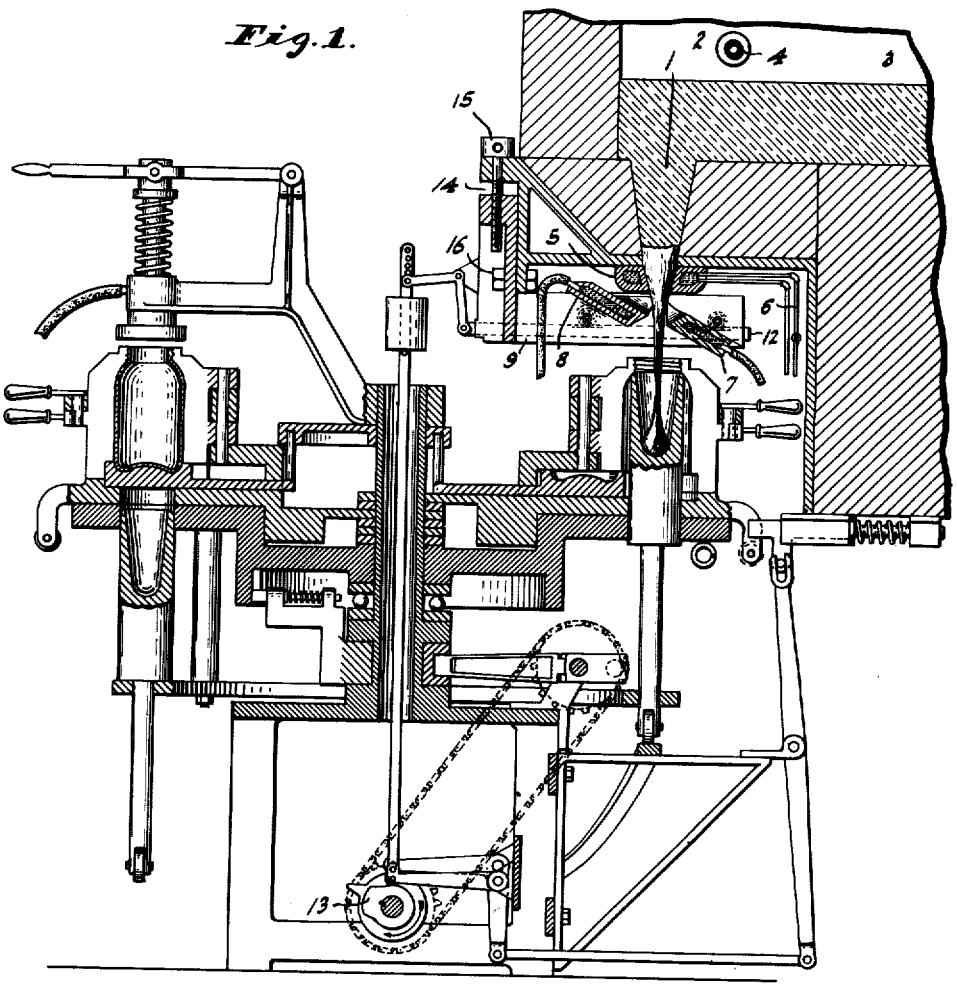
Figure 2:
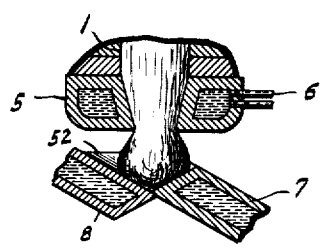
Figure 3:
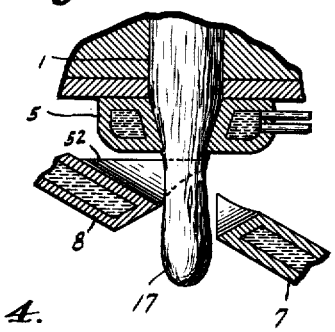
Figure 4:
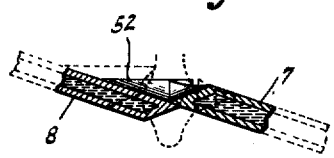
Figure 5:
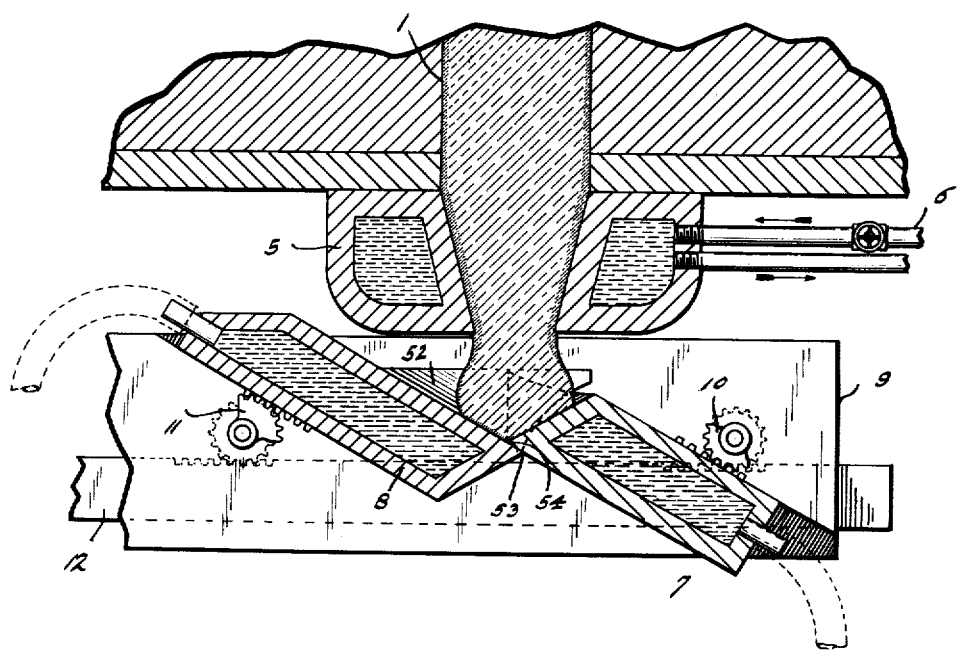

In the drawings which form a part of this specification, Figure 1 illustrates in cross-section one arrangement of cut-off and delivery mechanism suitable for the practice of my invention; Figs. 2 and 3 are detail views illustrating the action of the cut-off and delivery mechanism; Fig. 4 is a similar view showing a slight modification in the construction and arrangement of the cut-off parts; Fig. 5 a sectional view of the glass stream on a larger scale, illustrating diagrammatically the condition of the stream shortly after it has been cut; Fig. 6 a perspective view of a desirable form of cutters; Fig. 7 a perspective view of a modified form of cutters.

In the practice of my invention I preferably supply the molten glass to the cut-off and delivery parts of the apparatus through an opening 1 in the bottom block of a "dog house" extension or flow block chamber 2 which projects from the front of the melting furnace or main tank 3 in which the supply of molten material is prepared for use. The temperature in the flow block chamber is subject to local regulation and control by means of a burner 4 which enters one side of this chamber, and may be used, if necessary, to heat the glass contained therein somewhat above the temperature of the glass in the main portion of the furnace. I prefer however to keep the temperature of the molten material at just as low a point as will permit it to flow properly through the opening 1 in the bottom block. At the lower end of this opening I provide a water cooled ring or nozzle 5 of cast iron or other metal having a central opening somewhat smaller than the opening 1 and maintained at such a temperature, by the flowing water entering through the pipe 6, as to form a skin or sheath of partially congealed glass around the circumference of the opening in the ring 5 and extending slightly below the lower edge of this opening, as shown by heavy shaded portion in Fig. 5. This congealed skin or sheath of glass itself forms a non-conducting tube or guard through which the hotter glass flows downwardly without coming in contact with the surfaces of the iron of the ring block 5. By varying the temperature and the flow of water through the opening in this block the thickness of the congealed glass sheath may be varied to a considerable extent and the temperature of the flowing glass also varied to some extent; these two actions operating conjointly to vary the volume and rate of flow of the molten material. Further variation in such volume or rate of flow may be secured, if desired, by varying the size of the opening in block 5. Just below the lower or out-let surface of this block I arrange two reciprocating cut-off blades 7 and 8 which move in slides mounted on the L-shaped bracket 9. As shown in Figs. 1 and 5, these cut-off blades are arranged to move at an angle to the central line of the downwardly flowing stream of glass issuing from the opening in the block 5, and the angle of the cutting edges of these blades is such that when the said blades are brought together they form—as shown in Figs. 2 to 7—a conoidal pocket with symmetrically disposed sides for the reception and support of the cut-off end of the glass stream. The cutters may be varied in form to a considerable extent, but it is desirable to have the lower end of the stream approximate, as closely as possible, the lower end of the receiving mold by the time this end of the stream reaches the lower end of the mold. It is practical, therefore, to make the upper face of cutter 8 trough-like, as shown at 52, the cutting end notched, as shown at 53. Cutter 7 may then be semi-cylindrical, or cylindrical, as shown in Fig. 6, with its cutting end notched as indicated at 54, so that, when the cutters have been overlapped they will form a conoidal or pyramidal pocket for the reception of the swelling lower end of the glass stream. This arrangement of the cut-off blades at an angle to the horizontal, and the disposal of the cutting edges at corresponding angles to the horizontal, so as to form the symmetrical receiving pocket just referred to, constitutes one of the features of my invention, the advantages of which will be hereafter more fully referred to. The two cutting blades 7 and 8 are actuated simultaneously in their opening and closing movements by any suitable mechanical means, such, for example, as the rack and pinion mechanism shown in Fig. 5. This mechanism comprises two pinions 10 and 11 which are mounted on shafts extending across the lower member of the L-shaped frame 9 and engage respectively with racks on the blades 7 and 8. These pinions are themselves rotated simultaneously in the same direction—and in so rotating move the blades 7 and 8 in opposite directions—by means of pinions at the outer ends of the cross shafts which are engaged in turn by the reciprocating rack bar 12; the latter being moved at the required intervals of cut-off by any suitable means, as, for example, by the cam 13. The pinions 10 and 11 are preferably made of different size so as to move the two cut-off blades 7 and 8 at varying speed; the object of this arrangement being to bring the edge of the lower cut-off blade 7 to the central line of the downwardly flowing stream at the same time that the opposite edge of the upper cut-off blade 8 has been brought to the overlapping cut-off position shown in Figs. 2 and 5.

The bracket 9 on which the cut off blades are mounted is supported in slides 14 on the front wall of the flow block chamber and can be adjusted and clamped in any desired position by means of a screw 15 and bolts 16. This enables me to place the plane of the cut off blades 7 and 8 at any desired vertical distance below the face of the delivery opening in the block 5. The adjustment of this vertical distance and the resultant location of the plane of the cut off knives at a predetermined point below the flow block orifice—determined by the diameter of the glass stream and the physical conditions of the molten material—constitutes another important feature of my invention, for I have discovered that when the temperature of a flowing stream of glass is properly regulated and the said stream is cut at a short distance below the delivery orifice from which it issues, the flow of the molten material will momentarily be arrested, and the cut off stream or mass between the orifice and the plane of cut will remain practically stationary save for a slight lateral enlargement or swelling out such as is indicated to an exaggerated degree in Figs. 2 and 5. By adjusting the plane of the cut off up and down until this condition is secured, all lapping or folding over and piling up of the cut off end of the stream upon itself—such as occurs when the flowing stream is cut at some distance below the point of discharge and which is a very fruitful source of difficulty in ordinary flowing stream methods—can be completely avoided and a greatly improved mode of operation can be obtained. When the cut off blades are opened, as in Fig. 3 the enlarged "gob" or mass of glass 17 which has been resting on and between the symmetrically disposed closed shear blades 7 and 8, drops downward between the blades as shown in that figure—or by dotted lines in Fig. 4—in a homogeneous and unstratified mass, free from any "laps" or "chords" or entrained air bubbles and blisters; and the flow of clean undisturbed glass from the orifice in the block 5 is resumed and continues until the shear blades are once more closed by their actuating mechanism. This mechanism is preferably of such a character that both the opening and closing movements are performed as rapidly as possible—as for example by the special design of cam 13 of Fig. 1—so as to obtain a sharp clean cutting action on closing and a quick clean discharge on opening; and the shear blades may, if desired, be water cooled although—owing to the self supporting action of the cut off stream when severed at the point and in the manner above described—this is far less necessary in the practice of my improved method than it is in the practice of the ordinary flowing stream methods of cutting out and delivering individual molten masses or batches to glass machines.

The supply and cut off mechanism—comprising the water cooled discharge orifice block 5, the inclined reverse beveled shear blades 7 and 8 placed close below said block and coöperating when closed to form a symmetrical conoidal pocket for the reception of the cut off stream, and the reciprocating mechanism by which these blades are moved—symmetrically with relation to the stream—may be mounted as a whole on the wall or walls of the flow block chamber, as shown in Fig. 1 and used to supply a series of individual batches or masses of molten glass to any form of glass machine requiring such a series of individually delivered molten masses for its operation. It is for this reason that I have shown the parts above referred to as mounted independently of any particular glass machine, but it will be readily understood that all of these parts, save the water-cooled flow block 5 may be supported on the frame of the glass machine instead of on the walls of the flow block chamber.

In the arrangement illustrated in Fig. 1 the glass is shown as being supplied to one of the molds of a pressing and blowing machine similar in general respects to the ones used in the manufacture of fruit jars or wide mouth bottles, the details of which are not herein claimed.

As I have before explained the size of the flowing stream of glass may be varied to a considerable extent by varying the flow of cooling water through the hollow delivery plate 5, and thereby varying both the thickness of the chilled or congealed skin on the outside of the glass stream and also to some extent the temperature of the flowing glass itself. The rate of flow can also be varied by varying the temperature of the body of glass in the flow block chamber 2. If desired the flow can be further varied by altering the size of the orifice in the delivery plate or block 5 in any suitable manner, as, for example, by using adjustable gates. But I prefer to maintain the orifice in the block 5 at a uniform size, and regulate the volume of glass in each cut off mass as far as possible by varying the thickness of the skin at the edge of the delivery orifice in the manner above described. If such regulation, together with the regulation of the temperature in the flow block chamber, is not sufficient to maintain the cut-off masses at predetermined uniform volume I maintain that uniformity by regulation of the speed of the operation as a whole. It is of course understood that in this operation the mechanism which operates the cut-off blades is connected to and operated synchronously with the mechanism which actuates the mold carriers. In order to alter the volume of the cut-off masses deposited in successive molds, it is, therefore, only necessary to either accelerate or retard the speed of the driving motor by which the connected mechanism as a whole is operated. For this purpose a controlling rheostat may be used when the apparatus is driven by an electric motor, or some simple form of accelerating or retarding differential gears may be used when the apparatus is driven by a belt from a line shaft revolving at constant speed.

It will now be obvious to those skilled in the art that various detail modifications of construction in the delivery, in the cut-off, and in the mold actuating parts, may be made without departing from the spirit of my invention. For example, the angle of the cut-off blades and their inclination to the horizontal may be varied through a considerable range—as illustrated for example in Figs. 2 and 4—it being only desirable that the angles of the cutting edges of these blades be made substantially twice as great as the angle at which these blades are inclined to the horizontal, so that when the blades are closed there will be formed in each case a symmetrically disposed conoidal pocket, the sides of which are equally inclined to the axis of the glass stream. The angles employed in any case will be determined to some extent by the form and character of the mold in which the glass is to be deposited and subsequently molded to shape.

Throughout the description and claims, which form this specification, the terms "molten glass," "glass" and "molten material" are used, and intended to be used, as generally descriptive of that comparatively limited class of materials rendered plastic by heat but which do not, in the ordinary commercial manipulation thereof at least, reach such condition of fluidity as to be capable of splashing but, instead, remain viscous and somewhat dough-like in character, glass being probably the most characteristic of these materials and the one most commonly commercially manipulated in that condition.

Having now described my invention in sufficient detail to enable those skilled in the art to readily understand it, I claim:

1. In a glass working apparatus, the combination of a molten-glass container having a delivery outlet through which a stream of glass may issue, a cutting mechanism comprising a pair of coöperating shear blades arranged with the cutting plane at an angle to the lineal movement of the stream, the shear blade which moves in its cutting action toward the outflow orifice having a beveled end complementing the coöperating surface of the other shear blade, and a support for said shear blades adjustable lengthwise of the movement of the stream.

2. In a glass working apparatus, the combination of a molten-glass container having a delivery outlet through which a stream of glass may issue, and a cutting mechanism comprising a pair of coöperating shear blades arranged with the cutting plane at an angle to the lineal movement of the stream, the shear blade which moves in its cutting action toward the outflow orifice having a beveled end complementing the coöperating surface of the other shear blade.

3. In a glass working apparatus, the combination of a molten-glass container having a delivery outlet through which a stream of glass may issue, a trough-like cutter with its trough presented toward the oncoming stream, a coöperating cutter fitting the trough cutter and having a semi-conoidal or semi-pyramidal recess formed in its cutting end, and a support for said shear blades adjustable lengthwise of the movement of the stream.

4. In a glass working apparatus, the combination of a molten-glass container having a delivery outlet through which a stream of glass may issue, a trough-like cutter with its trough presented toward the oncoming stream, and a coöperating cutter fitting the trough cutter and having a semi-conoidal or semi-pyramidal recess formed in its cutting end.

5. In a glass working apparatus, the combination of a molten-glass container having a delivery outlet through which a stream of glass may issue, cutting mechanism associated with said orifice and having the cutting plane separated from the orifice by such an amount that, when the glass stream is cut by the cutting mechanism, the lineal movement of the exterior of the stream will be arrested and continued lineal movement of the interior of the stream will develop into internal lateral movement swelling the diameter of the stream adjacent the cutting plane, a heat absorbing orifice-structure separated from the cutters and through which the glass stream flows, and means for varying the heat absorbing capacity of said orifice-structure relative to the flowing stream.

6. In a glass working apparatus, the combination of a molten-glass container having a delivery outlet through which a stream of glass may issue, a cutting mechanism associated with and capable of retaining said stream, an adjustable support for said cutting mechanism permitting adjustment of the cutting plane lengthwise of the glass stream, a heat absorbing orifice-structure separated from the cutters and through which the glass stream flows, and means for varying the heat absorbing capacity of said orifice-structure relative to the flowing stream.

7. In a glass working apparatus, the combination of a molten-glass container having a delivery outlet through which a stream of glass may issue, a cutting mechanism comprising a pair of coöperating shear blades arranged with the cutting plane at an angle to the lineal movement of the stream, the shear blade which moves in its cutting action toward the outflow orifice having a beveled end complementing the coöperating surface of the other shear blade, a support for said shear blades adjustable lengthwise of the movement of the stream, a heat absorbing orifice-structure separated from the cutters and through which the glass stream flows, and means for varying the heat absorbing capacity of said orifice-structure relative to the flowing stream.

8. In a glass working apparatus, the combination of a molten-glass container having a delivery outlet through which a stream of glass may issue, a cutting mechanism comprising a pair of coöperating shear blades arranged with the cutting plane at an angle to the lineal movement of the stream, the shear blade which moves in its cutting action toward the outflow orifice having a beveled end complementing the coöperating surface of the other shear blade, a heat absorbing orifice-structure separated from the cutters and through which the glass stream flows, and means for varying the heat absorbing capacity of said orifice-structure relative to the flowing stream.

9. In a glass working apparatus, the combination of a molten-glass container having a delivery outlet through which a stream of glass may issue, a trough-like cutter with its trough presented toward the oncoming stream, a coöperating cutter fitting the trough cutter and having a semi-conoidal or semi-pyramidal recess formed in its cutting end, a support for said shear blades adjustable lengthwise of the movement of the stream, a heat absorbing orifice-structure separated from the cutters and through which the glass stream flows, and means for varying the heat absorbing capacity of said orifice-structure relative to the flowing stream.

10. In a glass working apparatus, the combination of a molten-glass container having a delivery outlet through which a stream of glass may issue, a trough-like cutter with its trough presented toward the oncoming stream, a coöperating cutter fitting the trough cutter and having a semi-conoidal or semi-pyramidal recess formed in its cutting end, a heat absorbing orifice-structure separated from the cutters and through which the glass stream flows, and means for varying the heat absorbing capacity of said orifice-structure relative to the flowing stream.

11. In a glass working apparatus, the combination of a molten glass container having a delivery outlet through which the glass may issue, of a cutting mechanism comprising a pair of coöperating shear blades capable of overlapping movement and so shaped as to form when closed and overlapped a conoidal or pyramidal recess for the reception and retention of the end of a glass stream issuing from the orifice.

In witness whereof, I, have hereunto set my hand at Indianapolis, Indiana, this fourteenth day of February, A. D. one thousand nine hundred and thirteen.

FRANK L. O. WADSWORTH.

Witnesses:
ARTHUR M. HOOD,
FRANK A. FAHLE.